United States Patent [19]

Ostwald

[11] 4,381,336
[45] Apr. 26, 1983

[54] CAST PIECE

[75] Inventor: Fritz Ostwald, Dreieich, Fed. Rep. of Germany

[73] Assignee: ITT Industries, Inc., New York, N.Y.

[21] Appl. No.: 278,123

[22] Filed: Jun. 29, 1981

[30] Foreign Application Priority Data

Jul. 7, 1980 [DE] Fed. Rep. of Germany ....... 3025636

[51] Int. Cl.³ ............................................. B22D 19/02
[52] U.S. Cl. .................................... 428/614; 428/682;
428/545; 428/558; 428/565; 188/73.31
[58] Field of Search ............... 428/614, 682, 545, 558, 428/565; 188/73.31

[56] References Cited

U.S. PATENT DOCUMENTS 3,239,319 3/1966 Pollard ................................ 188/255

FOREIGN PATENT DOCUMENTS 2533058 10/1977 Fed. Rep. of Germany .

Primary Examiner—Veronica O'Keefe
Attorney, Agent, or Firm—John T. O'Halloran; Alfred C. Hill

[57] ABSTRACT

The weight of a cast piece, such as a brake caliper casting, is reduced by inserting a core element of lower density than the density of the moulded or cast material into those areas of the cast piece which are not highly stressed when the cast piece is subjected to bending forces. Preferably, the core element is cast in place along with the casting material.

6 Claims, 2 Drawing Figures

CAST PIECE

BACKGROUND OF THE INVENTION

The present invention relates to a cast piece subjected to bending forces comprising a casting and a core element cast in this casting.

Though a workpiece or the like, which is composed of several components, is more costly in manufacture, it affords on the other hand the possibility of reducing the weight by an optimal shaping of the workpiece. As a result, a better exploitation of material may be attained with the bending load and the mounting space predetermined. The employment of such workpieces is particularly favorable in the case of automotive vehicles, since it is more and more desirable to build a vehicle of light weight.

With respect to a known workpiece of the type referred to hereinabove, such as disclosed in German Pat. No. 2,533,058, a tie anchor having a high coefficient of elasticity and constructed as a core element is embedded in the tension area. The tie anchor being completely enclosed by the cast material is protected against high tension forces to which it is susceptible. However, since the amount of bending tension increases with growing distance from the neutral axis, an optimal exploitation of the material is not possible because the point subject to the highest tensile stress is not represented by the tie anchor but by a casting layer.

It is further known that cavities are cast in support members subjected to bending forces in the area of the neutral axis which cavities, admittedly, reduce the weight, but influence the curve of tension via the remaining cross-section. There may occur high tension at the wall surfaces close to the cavity resulting in a premature fatigue of the material in this area. In the event of comparatively small cross sections, in which case the formation of a cavity would still be worthwhile for the purpose of weight reduction, the amount of tension in the thin walls may then exceed the nominal value allowed.

SUMMARY OF THE INVENTION

It is an object of the present invention to provide a workpiece of the type referred to hereinabove, which is of low weight and affords ease of and low-cost manufacture.

A feature of the present invention is the provision of a cast piece subjected to bending forces comprising a cast member; and a core element cast in the cast member in those areas of the cast piece which are subjected to minor tension, the core element having a density lower than the density of the cast member.

By this arrangement the material with higher strength is inserted at the points of maximum tension and the material with lower strength is inserted at the points of minimum tension. This results in saving weight while maintaining the same amount of strength. The strength-increasing effect of the core element is based on the fact that the struts' buckling resistance is increased by supporting the struts of a lattice-like casting which are subject to pressure and that, on account of the toothing effect caused by the surface roughness of the core element and of the casting, the core element takes upon itself a share of the load corresponding to the ratio of the coefficients of elasticity of core element and casting.

It is particularly favorable to have the casting enclose the cavities filled by the core element in the manner of a space lattice. It is achieved thereby that the core element is arranged only at points of low local tension and that the workpiece assumes the shape or the structure of a space lattice while having approximately equal strength. A like shaping of a workpiece results in a particularly light-weight construction.

In an advantageous embodiment of the present invention, portions of the core element extend up to the surface or project therefrom in the marginal areas of the workpiece which are subjected to minor tension. When casting a brake caliper, the core element is supported on the inside walls of the mould and thus obtains a safe and stable position. It is possible to manufacture in an easy and inexpensive way particularly gauge-accurate and thin walls having insignificant variations in tolerances.

Preferably, the cubic coefficient of expansion of the material the core element is made of is equal to or exceeds that of the material the casting is made of so that the core element is in friction contact with the walls of the casting and is particularly appropriate to receive tension-pressure forces.

To establish a particularly positive engagement of the core element with the casting, it is advantageous to have the cast material penetrate into the surface of the core element. The close connection enables the core element to receive shearing forces particularly well, and the fatigue strength of the workpiece is increased.

It is favorable if the material of the core element is inorganic and highly resistant to temperature, and to the end that the core element resists the high casting temperatures, remains in stable shape after the casting process and inheres a predeterminable strength. These requirements are met, for example, by silicic acid of stable shape, by cemented material, by interlaced whiskers or by a stable-shaped packing of spheres. These inserts contribute simultaneously to a reduction in weight and fulfill a supporting function at the casting.

In another advantageous embodiment of the present invention, the material of the core element has a vibration-damping effect on the casting. There are workpieces which are particularly susceptible to vibrations, i.e., they either transmit these vibrations to other components or emit the vibrations themselves as audible squeak noises. The material of the core element having the above-mentioned abilities will remedy this evil.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
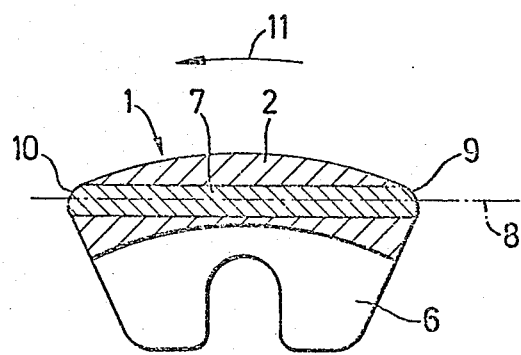
FIG. 1 is a transverse cross-sectional view of FIG. 2.
Figure 2:
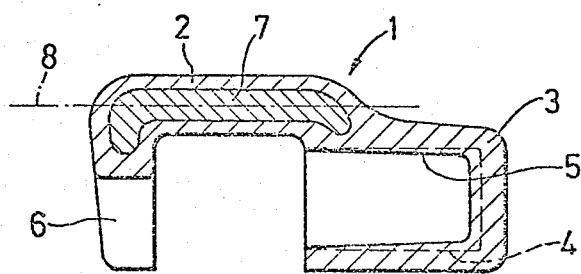
FIG. 2 is a longitudinal cross-sectional view of a blank of a brake caliper with a cast-in core element in accordance with the principles of the present invention.

The blank 1 for a brake caliper of a floating-caliper spot-type disc brake illustrated in FIGS. 1 and 2 comprises a caliper bridge 2, a housing 3 for an actuating cylinder being cast thereon. The cylinder bore 4 which will have to be made later by chip-cutting machining is indicated by dotted lines. The unworked cylinder bore 5 has already been preformed by a core during the casting process.

The caliper bridge 2 and the leg 6, which extends parallel to a brake disc (not shown), form that component which is required to first of all absorb the bending stress resulting from the transmission of the brake-actuating force. A core element 7 having a flat plate-like portion located in caliper bridge 2 extends in the area of the neutral tension axis 8 of the caliper bridge 2 and is totally enclosed on the top and bottom thereof by caliper bridge 2 in axial and radial direction of brake caliper 1. When viewing in the direction of disc rotation 11, core element 7 extends through caliper bridge 2 and terminates with its two ends 9 and 10 at the surface of caliper bridge 2. When casting brake caliper 1, the two ends 9 and 10 of core element 7 abut at the mould surface forming brake caliper 1 in order to safeguard a stable and a very precise position of core element 7. The density of core element 7 is lower than the density of the casting enclosing core element 7, while the used materials may be alike or different. The connection which has been obtained after the casting of brake caliper 1 and which has a high loading capacity permits an optimum of rigidity in addition to minimal space requirements and a low weight.

While I have described above the principles of my invention in connection with specific apparatus, it is to be clearly understood that this description is made only by way of example and not as a limitation to the scope of my invention as set forth in the objects thereof and in the accompanying claims.

I claim:

1. A cast brake caliper having a U-shape with two legs interconnected by a bridge portion, said bridge portion being subjected to bending forces, said cast caliper comprising:
   a cast member having said U-shape; and
   a core element cast in said cast member in said bridge portion, said core element having a flat plate-like portion extending between and into each of said two legs completely encased on the top and bottom by said cast member and extending to and exposed in both outer edges of said bridge portion, said core element having a density lower than the density of said cast member.
2. A cast piece according to claim 1, wherein
   said cast member is made of a material having a given cubic coefficient of expansion, and
   said core element is made of a material having a cubic coefficient of expansion equal to or greater than said given cubic coefficient of expansion.
3. A cast piece according to claim 2, wherein
   said cast member penetrates into surfaces of said core element.
4. A cast piece according to claim 3, wherein
   said core element is made of a material which is inorganic and highly resistant to temperature.
5. A cast piece according to claim 1, wherein
   said cast member penetrates into surfaces of said core element.
6. A cast piece according to claim 1, wherein
   said core element is made of a material which is inorganic and highly resistant to temperature.

* * * * *